(12) United States Patent
Ma

(10) Patent No.: US 9,888,281 B2
(45) Date of Patent: Feb. 6, 2018

(54) SET-TOP BOX, CLIENT, SYSTEM AND METHOD FOR ACCESS OF VIRTUAL DESKTOP

(71) Applicant: ZTE CORPORATION, Shenzhen, Guangdong (CN)

(72) Inventor: Chunlei Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/653,453

(22) PCT Filed: Aug. 15, 2013

(86) PCT No.: PCT/CN2013/081550
§ 371 (c)(1),
(2) Date: Jun. 18, 2015

(87) PCT Pub. No.: WO2014/094443
PCT Pub. Date: Jun. 26, 2014

(65) Prior Publication Data
US 2015/0350715 A1  Dec. 3, 2015

(30) Foreign Application Priority Data
Dec. 21, 2012 (CN) .......................... 2012 1 0560418

(51) Int. Cl.
*H04N 21/81* (2011.01)
*H04N 21/436* (2011.01)
(Continued)

(52) U.S. Cl.
CPC ......... *H04N 21/436* (2013.01); *G06F 9/4445* (2013.01); *G06F 9/455* (2013.01);
(Continued)

(58) Field of Classification Search
CPC .................................................... H04N 21/81
(Continued)

(56) References Cited

U.S. PATENT DOCUMENTS

2009/0006537 A1  1/2009 Palekar et al.
2010/0269135 A1  10/2010 Hulse et al.
(Continued)

FOREIGN PATENT DOCUMENTS

CN  102647620  8/2012
CN  103067365  4/2013
(Continued)

OTHER PUBLICATIONS https://support.microsoft.com/en-us/kb/186607, Understanding Remote Desktop Protocol (RDP), Jun. 22, 2014, entire document.*
(Continued)

*Primary Examiner* — Hunter B Lonsberry
(74) *Attorney, Agent, or Firm* — Plumsea Law Group, LLC

(57) ABSTRACT

A set-top box, a client, a system and method for virtual desktop access are disclosed. The set-top box includes a virtual desktop access module and a network connection module. The virtual desktop access module is configured to trigger the network connection module after receiving a virtual desktop access trigger signal, and trigger a signal display operation after receiving a virtual desktop signal sent by the network connection module. The network connection module is configured to send a virtual desktop connection request message through a network after receiving the trigger signal from the virtual desktop access module, and receive the virtual desktop signal through the network and send the virtual desktop signal to the virtual desktop access module. The virtual desktop access is completed by the set-top box.

6 Claims, 2 Drawing Sheets

(51) Int. Cl.
  *H04N 21/658* (2011.01)
  *H04L 29/08* (2006.01)
  *G06F 9/455* (2006.01)
  *H04L 29/06* (2006.01)
  *H04N 21/4227* (2011.01)
  *G06F 9/44* (2006.01)
  *G06Q 99/00* (2006.01)
  *H04N 21/214* (2011.01)

(52) U.S. Cl.
  CPC ............. *G06Q 99/00* (2013.01); *H04L 63/08* (2013.01); *H04L 67/08* (2013.01); *H04N 21/2143* (2013.01); *H04N 21/4227* (2013.01); *H04N 21/43615* (2013.01); *H04N 21/658* (2013.01)

(58) Field of Classification Search
  USPC ........................................ 725/133, 141, 153
  See application file for complete search history.

(56) References Cited

U.S. PATENT DOCUMENTS

2011/0153853 A1    6/2011  London et al.
2013/0290882 A1   10/2013  Cotte
2016/0198242 A1*   7/2016  Chen .................. H04N 7/17318
                                                              725/25

FOREIGN PATENT DOCUMENTS

DE    102010052244    5/2012
WO    2007024432      3/2007
WO    2011053858      5/2011

OTHER PUBLICATIONS

Microsoft, Configuring Remote Desktop, Nov. 3, 2005, entire document, https://technet.microsoft.com/enus/library/bb457106(d=printer).aspx.*

International Search Report for PCT/CN2013/081550, English translation attached to original, Both completed by the Chinese Patent Office dated Nov. 3, 2013, 5 Pages.

Extended European Search Report for European Application No. 13864456.2, Completed by the European Patent Office, dated Oct. 16, 2015, 6 Pages.

* cited by examiner

SET-TOP BOX, CLIENT, SYSTEM AND METHOD FOR ACCESS OF VIRTUAL DESKTOP

CROSS-REFERENCE TO RELATED APPLICATION

This application is the U.S. national phase of PCT Appln. No. PCT/CN2013/081550 filed Aug. 15, 2013 which claims priority to Chinese Application No. 201210560418.9 filed Dec. 21, 2012, the disclosures of which are incorporated in their entirety by reference herein.

TECHNICAL FIELD

The present document relates to the field of virtual machine desktop access, and in particular, to a set-top box, a client, a system and a method for virtual desktop access.

BACKGROUND OF THE RELATED ART

In recent years, with the continuous development of business travel, people's demands on a hotel is improving, from initially requiring the hotel to provide pure accommodation to requiring services of surfing on the internet, and then requiring the hotel to provide computer services, digital services, and so on. However, the hotel adopts many solutions in order to provide a computer to a customer. Currently, common solutions mainly include the following:

Solution 1: A customer is directly provided with a computer by the hotel.

In this solution, the hotel installs a PC in a room where the PC is required, and when the customer arrives the room, the customer can directly start the PC to use;

Advantages: this solution facilitates use of the PC of the customer, when the customer starts the PC, the customer can use it instantly, which is consistent with the use habit.

Disadvantages: Since the room will be power-off after the customer leave the room, if the customer forget to shut off the PC, it is easy to damage software and hardware of the PC; the hardware of the PC needs to be upgraded, which results in a high maintenance cost; since a system can not automatically delete any software which may be installed by the customer arbitrarily, the PC will be invaded by virus; customer's information, which the customer forgets to delete, will be divulged.

Solution 2: A customer is directly provided with a thin terminal by the hotel.

Advantages: due to its specific design (such as, automatic recovery, no mechanical component, remote management, etc.), the thin terminal overcomes the disadvantages caused by directly using a PC, for example, the designs of automatic recovery and no mechanical component for a terminal system can protect the terminal from the hardware damages caused by the virus and frequent power outages. the design of remote management for the thin terminal facilitates a perform remote maintenance on the terminal by a skilled person of the hotel.

Disadvantages: the configuration of the thin terminal is low, thereby only minimal software is installed.

Solution 3: a thin terminal accesses to a virtual desktop system remotely.

In this solution, the thin terminal, as a client, accesses to a remote virtual desktop system.

Advantages: advantages of security, energy-saving, unified maintenance management for backstage supporter and protecting privacy can be achieved by using the virtual desktop; it protects the terminal from the hardware damages caused by virus and frequency power outages, and it has many advantages of the PC and the thin terminal as well.

Disadvantages: the hotel only needs to add the separate terminal devices, and the user habit is extremely different from that of the PC.

Currently, hotels are generally configured with set-top boxes, if related set-top boxes serve as virtual desktop access ends, all advantages of thin terminals accessing to virtual desktops remotely can be achieved, and expenses of the hotel devices can also be reduced, while the resource utilization of the set-top boxes can be improved.

SUMMARY

The embodiments of the present document provide a set-top box, a client, a system and a method for virtual desktop access to solve the technical problem of how to realize and use a set-top box to implement the virtual desktop access.

To solve the above technical problem, the following schemes are adopted:

A set-top box for virtual desktop access, the set-top box comprises: a virtual desktop access module and a network connection module, wherein:

the virtual desktop access module is configured to trigger the network connection module after receiving a virtual desktop access trigger signal; and trigger a signal display operation after receiving a virtual desktop signal sent by the network connection module;

the network connection module is configured to send a virtual desktop connection request message through a network after receiving the trigger signal from the virtual desktop access module; and receive a virtual desktop signal through the network, and send the virtual desktop signal to the virtual desktop access module.

Alternatively, the virtual desktop access module is configured to perform access identity verification after receiving the virtual desktop access signal, and send the virtual desktop connection request message after passing the identity verification.

Alternatively, the virtual desktop access module is further configured to receive an operating action performed on the virtual desktop by a user, and send the operating action to the network connection module; and trigger the signal display operation after receiving a response signal sent by the network connection module;

the network connection module is further configured to send the operating action through the network after receiving the operating action from the virtual desktop access module; and receive the response signal for the operating action through the network, and send the response signal to the virtual desktop access module.

A client for virtual desktop access, the client comprises a set-top box and a display device, wherein:

the set-top box adopts the set-top box mentioned above, sends a signal to be displayed to the display device;

the display device is configured to receive and display the signal to be displayed sent by the set-top box.

A system for virtual desktop access, the system comprises a virtual desktop access server and a client, wherein:

the client adopts the client mentioned above;

the virtual desktop access server is configured to make a response to a message from the client, and return the response to the client.

A method for virtual desktop access of a set-top box, the method comprises the following steps:

receiving a virtual desktop access trigger signal;

sending a virtual desktop access request message through a network;

receiving a virtual desktop access signal through the network, and triggering a signal display operation.

Alternatively, access identity verification is performed after receiving the virtual desktop access signal, and the virtual desktop connection request message is sent through the network after passing the identity verification.

Alternatively, an operating action performed on the virtual desktop by a user is further received;

the operating action is sent through the network.

a response signal for the operating action is received through the network, and a signal display operation is triggered.

A method for virtual desktop access of a client, the method comprises the following steps:

a set-top box adopting the method mentioned above to access to a virtual desktop, wherein the set-top box sends a signal to be displayed to a display device;

the display device displaying the signal to be displayed.

A method for virtual desktop access, the method comprises the following steps:

a client adopting the method mentioned above to access to a virtual desktop;

a virtual desktop access server making a response to a message from the client, and returning the response to the client.

The function of the virtual desktop access is completed by the set-top box in the technical schemes above mentioned.

PREFERRED EMBODIMENTS OF THE INVENTION

In order to make the purpose, technical scheme and advantages of present document more apparently, the embodiments of the present document will be described in details below in conjunction with accompanying drawings. It should be illustrated that without a conflict, the embodiments of the present application and the features in the embodiments can be combined with each other randomly.

Virtual desktop is also known as desktop virtualization, and desktop cloud as well; it adopts a client-server mode to provide a desktop service to a user. A client serves as a virtual desktop access end, and is responsible for inputs and displays of the user. A server serves as a processing end to process the inputs and responses of the user, and at the same time, to return a interface back to the client to display. The server completes almost all processing tasks, while the client is merely a display function, thereby the requirement on client configuration is relatively low. However, current set-top box hardware configuration is relatively high, thereby it is capable of completing a function of a virtual desktop access end. For example, the set-top box has a CUP, a memory, a Flash, a network interface, a USB interface, and other hardware facilities, thus it possesses hardware configuration which is required by the virtual desktop access end.

Figure 1:
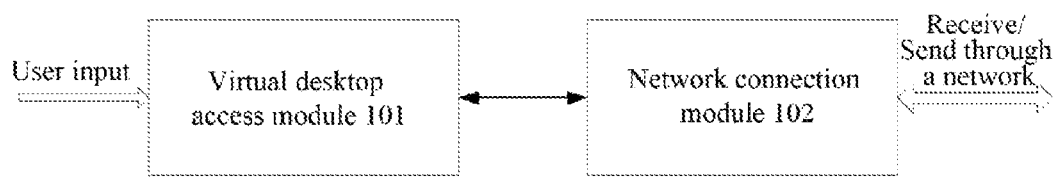
FIG. 1 is a composition diagram of modules of a set-top box for virtual desktop access according to the embodiment.

FIG. 1 is a composition diagram of modules of a set-top box for virtual desktop access according to the embodiment.

The set-top box comprises a virtual desktop access module 101 and a network connection module 102, wherein, the virtual desktop access module 101 is configured to trigger the network connection module 102 after receiving a virtual desktop access trigger signal; and trigger a display operation of the virtual desktop after receiving a virtual desktop signal sent by the network connection module 102;

A user sends a trigger signal through a mouse, keyboard, and other access devices to the set-top box; since the related set-top box has USB interfaces for connecting with the mouse and keyboard, thereby once software which supports the mouse, keyboard, and other access devices is installed on the set-top box, instantly input operations performed on the set-top box can be achieved by the corresponding input devices.

To ensure user information security, the virtual desktop access module further performs access identity verification after receiving a virtual desktop access trigger signal, and sends a virtual desktop connection request message after passing the identity verification.

The network connection module 102 is configured to send a virtual desktop connection request message through a network after receiving the trigger signal from the virtual desktop access module 101; and receive a virtual desktop signal through the network, and send the virtual desktop signal to the virtual desktop access module 101.

After the user performs operations on the virtual desktop, such as double clicking a desktop icon, carrying out a daily work under the virtual desktop, etc., the virtual desktop access module 101 also receives operating action performed on the virtual desktop by the user, and sends the operating action to the network connection module; after receiving a response signal sent by the network connection module, triggers a display operation of the response signal; at this point, the network connection module 102 is further configured to send the operating action through the network after receiving the operating action from the virtual desktop access module 101; and receive the response signal for the operating action through the network, and send the response signal to the virtual desktop access module 101.

The present document provides a client for virtual desktop access, the client comprises a set-top box and a display device, wherein:

the set-top box adopts the set-top box mentioned above, sends a signal to be displayed to the display device;

the display device is configured to receive and display the signal to be displayed sent by the set-top box.

The present document provides a system for virtual desktop access, the system comprises a virtual desktop access server and a client, wherein:

the client adopts the client as mentioned above;

the virtual desktop access server is configured to make a response to a message from the client, and return the response to the client.

Figure 2:
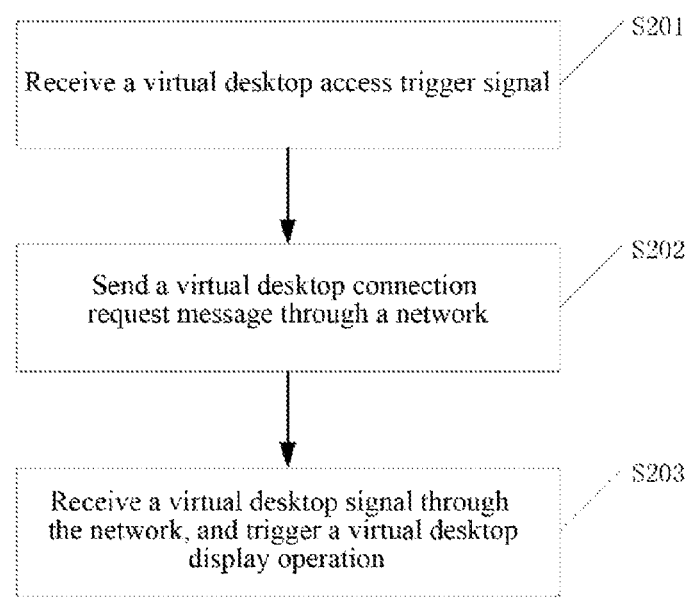
FIG. 2 is a flow chat of a method for virtual desktop access of a set-top box according to the embodiment.

The present document provides a method for virtual desktop access of a set-top box, as shown in the FIG. 2, the method comprises the following steps:

In step S201, it is to receive a virtual desktop access trigger signal;

To ensure user information security, it is to perform access identity verification after receiving the virtual desktop access trigger signal, and to send a virtual desktop connection request message through a network after passing the identity verification.

In step S202, it is to send the virtual desktop connection request message through the network;

In step S203, it is to receive a virtual desktop signal through the network, and to trigger a virtual desktop display operation.

After a user performs operation on the virtual desktop, the method for virtual desktop access of a set-top box mentioned above further comprises that:

it is to receive operating action performed on the virtual desktop by a user;

it is to send the operating action through a network;

it is to receive a response signal for the operating action through the network, and to trigger a signal display operation.

The present document provides a method for virtual desktop access of a client, the method comprises the following steps:

the set-top box adopts the method mentioned above to perform virtual desktop access, and sends a signal to be displayed to a display device;

the display device displays the signal to be displayed.

The present document provides a method for virtual desktop access, the method comprises the following steps:

a client adopts the method mentioned above to perform virtual desktop access;

a virtual desktop access server makes a response to a message from the client, and returns the response back to the client.

The method for virtual desktop access mentioned above will be described in details with a specific application example below.

Figure 3:
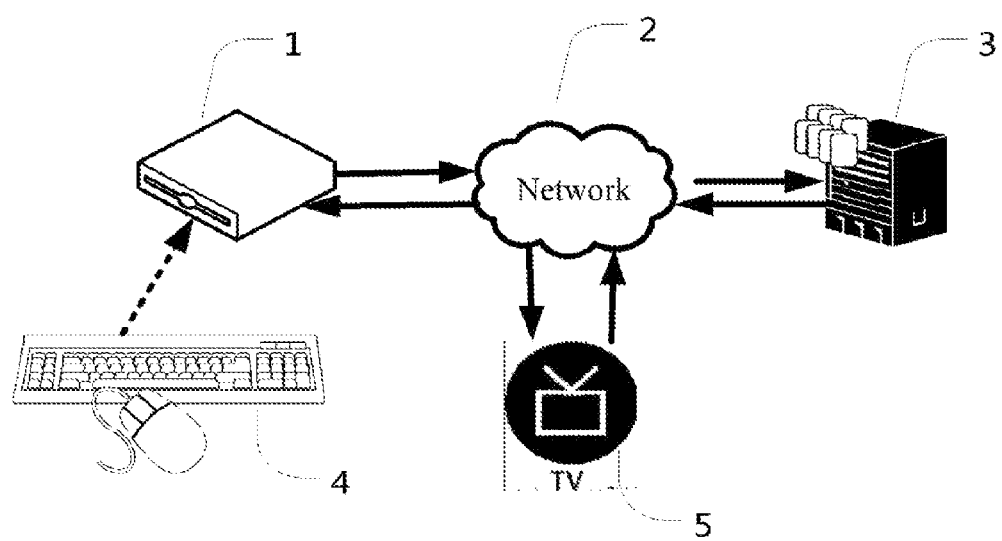
FIG. 3 is a schematic diagram of an application scenario of an application example.

As shown in FIG. 3, it is a scenario diagram of the application example, a system comprises a set-top box 1, a virtual desktop access server 3, and a television 5, wherein message interaction between the set-top box 1 and the virtual desktop access server 3 is performed through a network 2; a keyboard and mouse 4 serves as a user input device of the set-top box.

In step 1, the set-top box is powered on, and a virtual desktop access function trigger signal input by a user is detected;

In step 2, the set-top box 1 receives the address, user name, and password which are input by the user by using the keyboard and mouse 4.

In step 3, the set-top box performs identity verification on the user name and password, accesses the virtual desktop access server 3 corresponding to the address received in the step 2 through the network 2 after the identity verification is passed;

In step 4, the set-top box 1 sends a virtual desktop connection request message to the virtual desktop access server 3;

In the step 5, the virtual desktop access server 3 responds to the connection request message, and transports a virtual desktop signal back to the set-top box 1 through the network 2;

In the step 6, the set-top box 1 sends the received virtual desktop signal to the television 5;

In the step 7, the television 5 displays the virtual desktop signal;

In step 8, the set-top box 1 receives an operating action which is performed on the virtual desktop by user through the keyboard and mouse 4;

In step 9, the set-top box 1 sends the above operating action to the virtual desktop access server 3 through the network 2;

In step 10, the virtual desktop access server 3 makes a response to the operating action, and transports the response result back to the set-top box 1;

In step 11, the set-top box 1 sends the response result to the television 5 to display.

It can be understood by those skilled in the art that some or all steps in the above mentioned method can be fulfilled by instructing relevant hardware components with a program, and the program may be stored in a computer readable storage media such as read only memory, magnetic disk or optical disk and so on. Alternatively, all or part of steps of the above embodiments can be implemented by one and more integrated circuits, and correspondingly each module/unit in the aforementioned embodiment can be implemented in the form of hardware or software function module. The present document is not limited to any combination of specific hardware and software forms.

It is should be illustrated that, the present document may have other various embodiments, without departing from the sprite and essence of the present document, one skilled in the art may make a variety of changes and variations according to the present document, but the corresponding changes and variations should be included in the protection scope of the appended claims of the present document.

INDUSTRIAL APPLICABILITY

The function of the virtual desktop access is completed by the set-top box in the technical schemes above mentioned. Therefore, the present document has strong industrial applicability.

What is claimed is:

1. A set-top box for virtual desktop access, comprising: a virtual desktop access module and a network connection module, wherein:

the virtual desktop access module is configured to trigger the network connection module after receiving a virtual desktop access trigger signal, and trigger a signal display operation after receiving a virtual desktop signal sent by the network connection module;

the network connection module is configured to send a virtual desktop connection request message through a network after receiving the trigger signal from the virtual desktop access module, and receive the virtual desktop signal through the network, and send the virtual desktop signal to the virtual desktop access module;

wherein the set-top box is connected to a display device, a keyboard and a mouse; the set-top box sends the virtual desktop signal to the display device to display a virtual desktop on the display device; the set-top box receives an operating action which is performed on the virtual desktop by a user through the keyboard and mouse; the set-top box sends the operating action to a virtual desktop access server through a network; the virtual desktop access server makes a response result corresponding to the operating action, and transports the response result back to the set-top box; the set-top box sends the response result to the display device to display the response result on the virtual desktop;

wherein the virtual desktop access module is configured to, after receiving the virtual desktop access trigger signal, trigger the network connection module by means of:

the virtual desktop access module of the set-top box performs identity verification to access the virtual desktop access server corresponding to an address input by the user by using the keyboard and mouse after receiving the virtual desktop access trigger signal, and the virtual desktop connection request message is sent by the network connection module of the set-top box after the identity verification performed by the virtual desktop access module of the set-top box is passed, wherein when the identity verification performed by the virtual desktop access module of the set-top box is not passed, the network connection module of the set-top box does not send the virtual desktop connection request message to the virtual desktop access server through the network;

wherein software which supports the mouse and the keyboard is installed on the set-top box.

2. The set-top box according to claim 1, wherein, the virtual desktop access module is further configured to receive the operating action performed on the virtual desktop by the user, and send the operating action to the network connection module; and trigger the signal display operation after receiving a response signal sent by the network connection module;

the network connection module is further configured to send the operating action through the network after receiving the operating action from the virtual desktop access module; and receive the response signal for the operating action through the network, and send the response signal to the virtual desktop access module.

3. A method for virtual desktop access of a set-top box, comprising the following steps:

sending, by a set-top box connected to a display device, a keyboard and a mouse, a virtual desktop connection request message to a virtual desktop access server through a network;

transporting, by the virtual desktop access server, a virtual desktop signal back to the set-top box through the network;

sending, by the set-top box, the virtual desktop signal to the display device;

displaying, by the display device, a virtual desktop according the virtual desktop signal;

receiving, by the set-top box, an operating action which is performed on the virtual desktop by a user through the keyboard and the mouse;

sending, by the set-top box, the operating action to the virtual desktop access server through the network;

making, by the virtual desktop access server, a response result corresponding to the operating action, and transporting the response back to the set-top box; and sending, by the set-top box, the response result to the display device to display the response result on the virtual desktop;

wherein before sending, by the set-top box, the virtual desktop connection request message to the virtual desktop access server, the method further comprises:

performing, by the set-top box, identity verification to access the virtual desktop access server corresponding to an address input by the user by using the keyboard and mouse, wherein when the identity verification performed by the set-top box is not passed, the set-top box does not send the virtual desktop connection request message to the virtual desktop access server through the network;

wherein software which supports the mouse and the keyboard is installed on the set-top box.

4. The method according to claim 3, further comprising:
after the set-top box is powered on, detecting, by the set-top box, a virtual desktop access function trigger signal input by the user.

5. The set-top box according to claim 1, wherein the set-top box has USB interfaces for connecting with the mouse and the keyboard.

6. The method according to claim 3, wherein the set-top box has USB interfaces for connecting with the mouse and the keyboard.

* * * * *